US012656872B2

(12) United States Patent
    Fahrenkopf et al.

(10) Patent No.: US 12,656,872 B2
(45) Date of Patent: Jun. 16, 2026

(54) SYSTEM AND METHOD FOR DEVICE FEEDBACK CONTROL

(71) Applicant: APPLE INC., Cupertino, CA (US)

(72) Inventors: Max Fahrenkopf, Palo Alto, CA (US);
    Matthew D. Fortier, San Jose, CA
    (US)

(73) Assignee: APPLE INC., Cupertino, CA (US)

( * ) Notice: Subject to any disclaimer, the term of this
    patent is extended or adjusted under 35
    U.S.C. 154(b) by 0 days.

(21) Appl. No.: 18/888,887

(22) Filed: Sep. 18, 2024

(65) Prior Publication Data

US 2025/0110559 A1    Apr. 3, 2025

Related U.S. Application Data

(60) Provisional application No. 63/541,007, filed on Sep.
    28, 2023.

(51) Int. Cl.
    *G06F 3/01*        (2006.01)
    *H04N 23/61*       (2023.01)
    *H04N 23/695*      (2023.01)

(52) U.S. Cl.
    CPC ............. *G06F 3/016* (2013.01); *H04N 23/61*
    (2023.01); *H04N 23/695* (2023.01)

(58) Field of Classification Search
    None
    See application file for complete search history.

(56) References Cited

U.S. PATENT DOCUMENTS 5,789,890 A    8/1998  Genov et al.
    6,121,743 A    9/2000  Genov et al.

6,995,536 B2    2/2006   Challoner
    7,161,322 B2    1/2007   Wang et al.
    7,593,030 B2    9/2009   Wang et al.
    7,844,397 B2    11/2010  Lund et al.
    8,260,460 B2    9/2012   Sanders et al.
    8,350,843 B2    1/2013   Rogowitz et al.
    8,351,773 B2    1/2013   Nasiri et al.
    8,583,282 B2    11/2013  Angle et al.
    8,994,776 B2    3/2015   Sutherland et al.
    9,082,270 B2    7/2015   Bogsanyi
    9,273,946 B2    3/2016   Siercks
                    (Continued)

FOREIGN PATENT DOCUMENTS

JP       2004147279 A     5/2004
    TW       I353503 B        12/2011

OTHER PUBLICATIONS

Salisbury, K., et al., "Haptic Rendering: Introductory Concepts",
IEEE Computer Society, IEEE Computer Graphics and Applica-
tions, Mar./Apr. 2004 (9 pp).
                    (Continued)

*Primary Examiner* — Clifford Hilaire

(74) *Attorney, Agent, or Firm* — Young Basile Hanlon &
MacFarlane, P.C.

(57)                ABSTRACT

A system applies a feedback force along the first axis in
response to a repositioning force applied to a component by
a user. A controller determines a target position for the
component and varies the feedback force in accordance with
a position of the component with respect to the target
position wherein the feedback force is different in a first
direction away from the target position than in a second
direction toward the target position.

20 Claims, 8 Drawing Sheets

(56) References Cited

U.S. PATENT DOCUMENTS

| | | | |
|---|---|---|---|
| 9,327,397 | B1 | 5/2016 | Williams et al. |
| 9,520,036 | B1 | 12/2016 | Buuck et al. |
| 9,533,411 | B2 | 1/2017 | Jacobsen et al. |
| 9,535,501 | B1 | 1/2017 | Moussette et al. |
| 9,549,781 | B2 | 1/2017 | He et al. |
| 9,678,102 | B2 | 6/2017 | Ho et al. |
| 9,823,631 | B1 | 11/2017 | Loo et al. |
| 9,849,595 | B2 | 12/2017 | Wang et al. |
| 9,919,424 | B1 | 3/2018 | Devengenzo |
| 9,921,652 | B2 | 3/2018 | Moussette et al. |
| 9,977,500 | B2 | 5/2018 | Westerman et al. |
| 10,137,011 | B2 | 11/2018 | Herr et al. |
| 10,328,836 | B2 | 6/2019 | Purwin et al. |
| 10,353,491 | B2 | 7/2019 | Bruza et al. |
| 10,357,881 | B2 | 7/2019 | Faridi et al. |
| 10,391,636 | B2 | 8/2019 | Breazeal |
| 10,415,286 | B1* | 9/2019 | Porcella ............... G06F 1/1679 |
| 10,534,431 | B2 | 1/2020 | Erivantcev et al. |
| 10,551,923 | B2 | 2/2020 | Pirasmepulkul et al. |
| 10,555,865 | B2 | 2/2020 | Zhang et al. |
| 10,635,174 | B2 | 4/2020 | Battlogg |
| 10,689,831 | B2 | 6/2020 | Kean et al. |
| 10,798,339 | B2 | 10/2020 | McMillan et al. |
| 10,828,527 | B2 | 11/2020 | Mahoney et al. |
| 10,975,926 | B2 | 4/2021 | Battlogg |
| 10,976,827 | B2 | 4/2021 | Battlogg |
| 10,976,863 | B1 | 4/2021 | Erivantcev et al. |
| 10,987,192 | B2 | 4/2021 | Garcia Kilroy et al. |
| 11,054,923 | B2 | 7/2021 | Erivantcev et al. |
| 11,265,469 | B1 | 3/2022 | Gangwal et al. |
| 11,305,431 | B2 | 4/2022 | Ghazaei Ardakani et al. |
| 11,360,561 | B2 | 6/2022 | Richter et al. |
| 11,413,210 | B2 | 8/2022 | Contreras-Vidal et al. |
| 11,425,412 | B1 | 8/2022 | Gigliotti et al. |
| 11,430,170 | B1 | 8/2022 | Sivapurapu et al. |
| 11,610,476 | B2 | 3/2023 | Bataillou et al. |
| 2004/0204059 | A1 | 10/2004 | Wong et al. |
| 2004/0232632 | A1 | 11/2004 | Beck et al. |
| 2006/0190136 | A1 | 8/2006 | Boyer |
| 2007/0013336 | A1 | 1/2007 | Nowlin et al. |
| 2007/0055289 | A1 | 3/2007 | Scouten et al. |
| 2007/0150107 | A1 | 6/2007 | Ogawa et al. |
| 2007/0201035 | A1 | 8/2007 | Dresel |
| 2009/0102620 | A1 | 4/2009 | Kato et al. |
| 2009/0204261 | A1 | 8/2009 | Strand et al. |
| 2010/0094312 | A1 | 4/2010 | Ruiz Morales et al. |
| 2010/0152899 | A1 | 6/2010 | Chang et al. |
| 2010/0188267 | A1 | 7/2010 | Hanlon et al. |
| 2010/0228265 | A1 | 9/2010 | Prisco |
| 2011/0004343 | A1 | 1/2011 | Iida |
| 2011/0052366 | A1 | 3/2011 | Bonin et al. |
| 2011/0071347 | A1 | 3/2011 | Rogers et al. |
| 2011/0071541 | A1 | 3/2011 | Prisco et al. |
| 2011/0071544 | A1 | 3/2011 | Steger et al. |
| 2011/0160745 | A1 | 6/2011 | Fielding et al. |
| 2011/0234484 | A1 | 9/2011 | Ogawa et al. |
| 2011/0242158 | A1 | 10/2011 | Takata et al. |
| 2011/0264259 | A1 | 10/2011 | Boyer et al. |
| 2012/0078416 | A1 | 3/2012 | Iba et al. |
| 2012/0173106 | A1 | 7/2012 | Takenaka et al. |
| 2013/0013108 | A1 | 1/2013 | Jacobsen et al. |
| 2013/0041219 | A1 | 2/2013 | Hasegawa et al. |
| 2013/0325030 | A1 | 12/2013 | Hourtash et al. |
| 2013/0345869 | A1 | 12/2013 | Chen et al. |
| 2014/0039517 | A1 | 2/2014 | Bowling et al. |
| 2014/0107843 | A1 | 4/2014 | Okazaki |
| 2014/0114479 | A1 | 4/2014 | Okazaki |
| 2014/0153168 | A1 | 6/2014 | Hida |
| 2014/0222207 | A1 | 8/2014 | Bowling et al. |
| 2014/0257569 | A1 | 9/2014 | Yip et al. |
| 2014/0267114 | A1 | 9/2014 | Lisseman et al. |
| 2015/0019013 | A1 | 1/2015 | Rose et al. |
| 2015/0130730 | A1 | 5/2015 | Harley et al. |
| 2015/0198983 | A1 | 7/2015 | Faith et al. |
| 2015/0201160 | A1 | 7/2015 | Polyakov et al. |
| 2015/0224639 | A1 | 8/2015 | Dockter |
| 2016/0123059 | A1 | 5/2016 | Liu |
| 2016/0182857 | A1 | 6/2016 | Avrahami et al. |
| 2016/0227193 | A1 | 8/2016 | Osterwood et al. |
| 2017/0131770 | A1 | 5/2017 | Keller et al. |
| 2017/0165567 | A1 | 6/2017 | Walters |
| 2017/0173262 | A1 | 6/2017 | Veltz |
| 2017/0343695 | A1 | 11/2017 | Stetson et al. |
| 2018/0064498 | A1 | 3/2018 | Kapadia et al. |
| 2018/0126553 | A1 | 5/2018 | Corkum et al. |
| 2018/0257688 | A1 | 9/2018 | Carter et al. |
| 2018/0283016 | A1 | 10/2018 | Telleria et al. |
| 2018/0341384 | A1 | 11/2018 | Dubovsky et al. |
| 2019/0061941 | A1* | 2/2019 | Zhang ................... B64U 10/13 |
| 2019/0093373 | A1 | 3/2019 | Telleria et al. |
| 2019/0209080 | A1 | 7/2019 | Gullotti et al. |
| 2019/0375102 | A1 | 12/2019 | Wang et al. |
| 2020/0021675 | A1 | 1/2020 | Cheng |
| 2020/0088251 | A1 | 3/2020 | Battlogg |
| 2020/0319768 | A1 | 10/2020 | Drake et al. |
| 2020/0379593 | A1 | 12/2020 | de Vries et al. |
| 2021/0096648 | A1 | 4/2021 | Summit |
| 2021/0114199 | A1 | 4/2021 | Mhd et al. |
| 2021/0129329 | A1 | 5/2021 | Pipe-Mazo et al. |
| 2021/0129339 | A1 | 5/2021 | Pipe-Mazo et al. |
| 2021/0392255 | A1 | 12/2021 | Zhu et al. |
| 2021/0398360 | A1 | 12/2021 | Drummond et al. |
| 2022/0015935 | A1 | 1/2022 | Hochmann et al. |
| 2022/0146617 | A1* | 5/2022 | Nakagawa .............. G01S 3/802 |
| 2024/0333831 | A1 | 10/2024 | Pedan et al. |
| 2024/0419220 | A1 | 12/2024 | Liu et al. |

OTHER PUBLICATIONS

Hayward, V., et al., "Haptic Interfaces And Devices", Emerald Group Publishing Limited, <www.emeraldinsight.com/0260-2288. htm,> Sensor Review, vol. 24, No. 1, 2004 (14 pp).

3D Systems, "Phantom Premium Haptic Devices", <www.3dsystems. com/haptics-devices/3d-systems-phantom-premium,> Downloaded Aug. 6, 2024 (5 pp).

* cited by examiner

580

581b

585

584

582

581a

584

583

586

SYSTEM AND METHOD FOR DEVICE FEEDBACK CONTROL

CROSS-REFERENCE TO RELATED APPLICATIONS

This application claims the benefit of, and priority to, U.S. Provisional Application No. 63/541,007, filed on Sep. 28, 2023, the contents of which are hereby incorporated by reference in their entirety herein for all purposes.

FIELD

The present disclosure relates generally to the field of device feedback control.

BACKGROUND

Devices may produce various outputs that provide information to a user or assist use of the device in some manner. In some devices, forces may be applied to a portion of the device in order to provide feedback to the user.

SUMMARY

A first aspect of the disclosure is a device that includes a member that connects a first part to a second part of the device. The device also includes a controller configured to determine a target position and to vary the feedback force in accordance with a position of the second part with respect to the target position wherein the feedback force is different in a first direction away from the target position than in a second direction toward the target position. In some implementations of the device, the feedback force is higher in the first direction than in the second direction. In some implementations of the device, the feedback force is lower in the first direction than in the second direction. The device also includes one or more components that apply a feedback force to the second part along the first axis in response to a force applied to the second part by a user.

In some implementations of the device, the member is configured to allow movement of the second part with respect to the first part about a first axis. In some implementations of the device, the member is further configured to allow movement of the second part with respect to the first part about a second axis. In some implementations of the device, the second axis is orthogonal to the first axis. In some implementations of the device, the feedback force is a first feedback force, and the one or more actuators are further configured to apply a second feedback force along the second axis. In some implementations of the device, a magnitude of the first feedback force is different than a magnitude of the second feedback force.

In some implementations of the device, the device includes a camera configured to obtain images of an environment around the device. In some implementations of the device, the camera is coupled to the second part. In some implementations of the device, the target position is determined according to a position of an entity detected using the camera. In some implementations of the device, the entity is the user of the device. In some implementations of the device, the target position is selected from a group of positions of interest that each represent an entity that is detected by the camera within a current field of view of the camera. In some implementations of the device, the controller operates the one or more actuators to rotate the second part with respect to the first part, and the target position is selected from a group of positions of interest that each represent an entity that is detected by the camera during rotation of the second part with respect to the first part. In some implementations of the device, the target position is determined by a software application executed by the controller.

A second aspect of the disclosure is a device. The device includes a first part and a second part. The device also includes a member that is connected to the first part and the second part to allow movement of the second part with respect to the first part about a first axis. The device also includes a camera configured to obtain images of an environment around the device. The device also includes a controller configured to obtain an input that identifies an entity in the images, to determine a position of the entity in the images, to set a target position according to the position of the entity in the images, and to vary the feedback force in accordance with a position of the second part with respect to the target position, wherein the feedback force is higher in a first direction away from the target position than in a second direction toward the target position. The device also includes one or more components that apply a feedback force to the second part along the first axis in response to a force applied by a user.

In some implementations of the device, the input is a spoken command that refers to the entity in the images. In some implementations of the device, the spoken command includes a name of the entity in the images. In some implementations of the device, one or more of the images are analyzed, according to machine vision techniques, to identify the position of the entity in the images according to the name of the entity.

A third aspect of the disclosure is a method that includes determining a target position for a second part with respect to a first part. The method also includes comparing a current position of the second part to the target position. The method also includes sensing an external force that is applied to the second part. The method also includes determining whether a direction of the external force corresponds to movement of the second part away from the target position or movement of the second part toward the target position. The method also includes applying a feedback force to the second part using one or more actuators. The feedback force is applied according to a first magnitude in response to determining that the direction of the external force corresponds to movement of the second part away from the target position, and the feedback force is applied according to a second magnitude in response to determining that the direction of the external force corresponds to movement of the second part toward the target position.

In some implementations of the method, the first magnitude of the feedback force is higher than the second magnitude of the feedback force. In some implementations of the method, the first magnitude of the feedback force is lower than the second magnitude of the feedback force. In some implementations of the method, the feedback force is a first feedback force that is applied along a first axis, and the one or more actuators are further configured to apply a second feedback force along a second axis. Some implementations of the method include obtaining images of an environment using a camera coupled to the second part. Some implementations of the method include detecting an entity using the images from the camera and determining the target position according to a position of the entity.

A fourth aspect of the disclosure is a non-transitory computer-readable storage device comprising program instructions that, when executed by a processor, cause the processor to perform operations. The operations include determining a target position for a second part with respect to a first part, comparing a current position of the second part to the target position, sensing an external force that is applied to the second part, determining whether a direction of the external force corresponds to movement of the second part away from the target position or movement of the second part toward the target position, and applying a feedback force to the second part using an one or more actuators. The feedback force is applied according to a first magnitude in response to determining that the direction of the external force corresponds to movement of the second part away from the target position, and the feedback force is applied according to a second magnitude in response to determining that the direction of the external force corresponds to movement of the second part toward the target position.

In some implementations, the first magnitude of the feedback force is higher than the second magnitude of the feedback force. In some implementations, the first magnitude of the feedback force is lower than the second magnitude of the feedback force. In some implementations, the feedback force is a first feedback force that is applied along a first axis, and the one or more actuators are further configured to apply a second feedback force along a second axis. In some implementations of the non-transitory computer-readable storage device, the operations further comprise obtaining images of an environment using a camera coupled to the second part. In some implementations, the operations further comprise detecting an entity using the images from the camera and determining the target position according to a position of the entity.

DETAILED DESCRIPTION

Figure 1A:
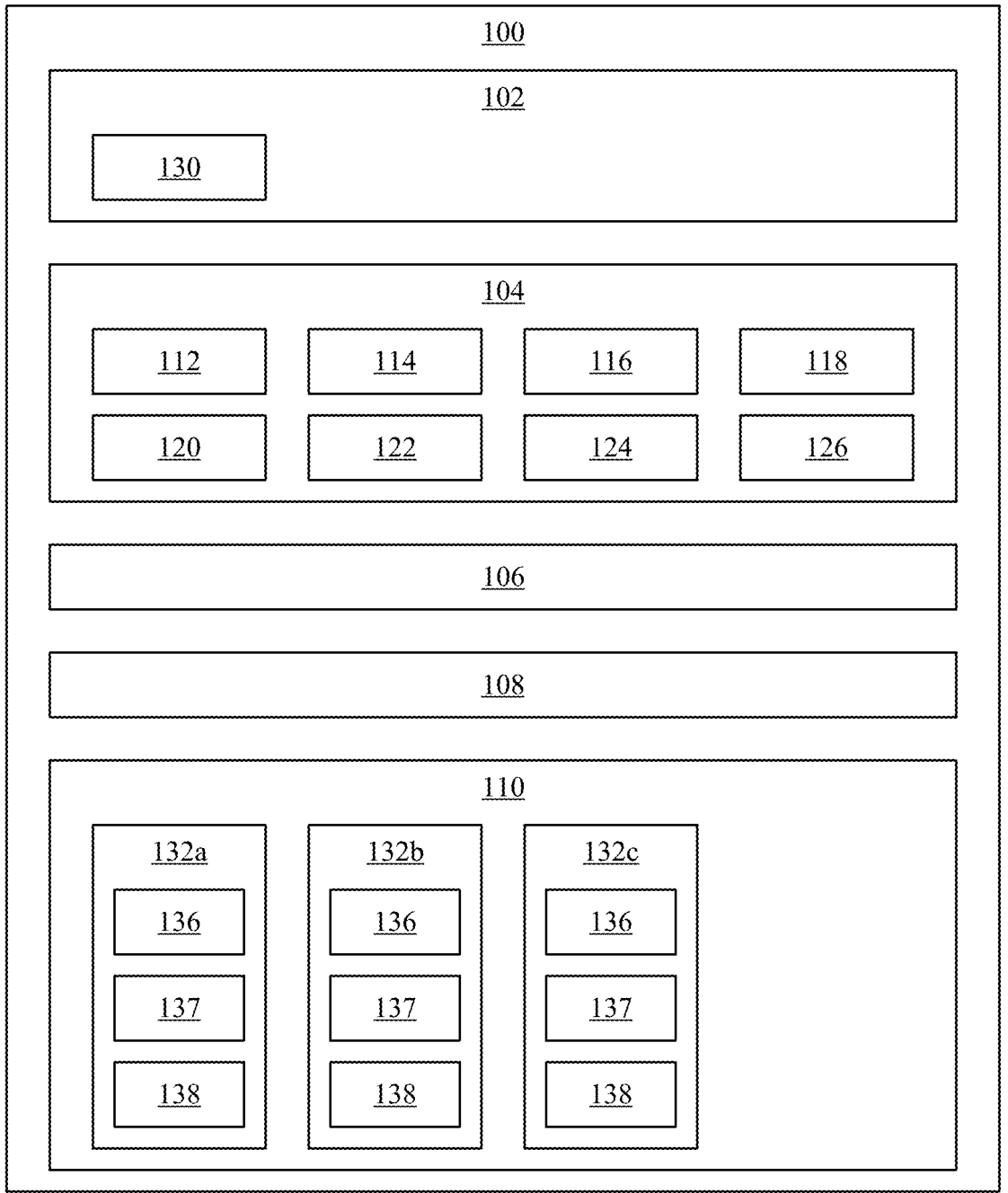
FIG. 1A is a block diagram of a device according to an example.

FIG. 1A is a block diagram of a device 100 according to an example. The device 100 is an electronic device that is intended to be used by a user, such as by displaying content that can be seen by the user, outputting audio that can be heard by the user, and recognizing user inputs, by which the user is able to control functionality of the device 100. The device 100 includes a second part 104 that is coupled to a first part 102 by a member 106. The device 100 also includes a controller 108 and an actuator system 110 (e.g., including one or more actuators).

The first part 102 is a structure that supports the second part 104. The first part 102 may be a portion of the device 100, or the first part 102 may be an external structure that the second part 104 is mounted to. The first part 102 is configured to support the device 100 by connection of the second part 104 to the first part 102 by the member 106. As an example, the first part 102 may be a surface (e.g., a table, a countertop, etc.) or an object (e.g., a wall, a pillar, a cabinet, etc.) that the member 106 is coupled to, by suitable means such as mechanical fasteners. Alternatively, in implementations in which the first part 102 is a portion of the device 100, the first part 102 may be a bracket housing or other structure that is able to support the device 100 by disposition of the first part 102 on a surface or connection of the first part 102 to an object by suitable means such as mechanical fasteners. The second part 104 is a primary portion of the device 100. The second part 104 of the device 100 is intended to be adjustably repositionable relative to the first part 102 using the member 106. Thus, for example, the second part 104 may be moved by the user to a convenient location at which functionality of the components that are included in the second part 104 may be utilized by the user.

The second part 104 includes components that enable functionality of the device 100, such as input and output functions that allow a user to interact with the device 100. As examples, the second part 104 of the device 100 may include input components that allow a user to interact with the device 100 through contact-based gesture inputs, non-contact gesture inputs, operation of physical buttons, manual manipulation of the second part 104 or a portion thereof, spoken inputs, and/or visual inputs. Herein, first part 102 may be referred to as a base part or a proximal part, and second part 104 may be referred to as an end part or a distal part. It should be noted that the names "base part" and "end part" are terms of convenience that indicate that the second part 104 is a portion of the device 100 (e.g., a first portion) that is configured to move relative to the first part 102 utilizing an intervening structure that facilitates the motion, such as the member 106 (e.g., a second portion). These terms are not intended to limit the structural configuration to one in which the first part 102 and the second part 104 are at opposed ends of a kinematic chain with no further elements connected outward from them. On the contrary, the first part 102 and the second part 104 may be positioned at intermediate locations along a kinematic chain, so long as the second part 104 is movable with respect to the frame of reference of the first part 102.

The member 106 is configured to allow repositioning of the second part 104 with respect to the first part 102, including manual repositioning and/or motorized repositioning, as will be described. As examples, the member 106 may be or include a hinge, a pivot, a ball joint, a spring, or any other suitable structure that allows the second part 104 to move relative to the first part 102. The member 106 may include multiple joints that, together, allow the second part 104 to be moved in a desired manner with respect to the first part 102. As an example, many known configurations can be used to implement motion in one, two, or three degrees of translational freedom, and/or in one, two, or three degrees of rotational freedom. As one example, the member 106 could be implemented according to six-axis robot configurations. An exemplary implementation of the member 106 will be discussed further herein.

The controller 108 is configured to exercise control over the systems of the device 100 in order to implement the functionality described herein. Such processes can be implemented using one or more computing devices, such as one or more computing devices incorporated in the controller 108, or such as the controller 108 together with another computing device. As an example, the processes described herein and the steps thereof may be implemented in the form of computer program instructions that are executable by one or more computing devices, wherein the instructions, when executed by the one or more computing devices, cause the one or more computing devices to perform functions that correspond to the steps of the processes. In an example, the controller 108 may include one or more processors, a memory that is configured for short-term storage of computer program instructions that are executable by the one or more processors, a long-term storage device that is configured for long-term storage of the computer program instructions and other information, and/or other computing components. Other implementations are possible, and the controller 108 may be implemented in the form of, for example, a solid-state circuit, an application specific integrated circuit, a field programmable gate array, or another suitable form. The controller 108 may be configured to communicate with various input devices and output devices that allow a user to interact with the controller 108.

The device 100 includes the actuator system 110, which is configured to apply force to the second part 104. As examples, the actuator system 110 may be utilized to apply force to the second part 104 to move the second part 104 with respect to the first part 102, to apply a feedback force (e.g., a feedback force or feedback torque) to the second part 104 during manual repositioning of the second part 104 with respect to the first part 102, and to apply haptic effects to the second part 104 to provide information to the user of the device 100 while the user is touching, grasping, or otherwise in physical contact with the second part 104 of the device 100. As one example, the controller 108 may provide a command to the actuator system 110 that causes the actuator system 110 to move the second part 104 of the device to a specified position, according to a velocity value, or according to an acceleration value. As another example, the controller 108 may provide a command to the actuator system 110 that causes the actuator system 110 to apply force feedback to the second part 104 in opposition to an external force that is applied to the second part 104. As one example, the controller 108 may provide a command to the actuator system 110 that causes the actuator system 110 to apply a haptic effect to the second part 104 according to a specified haptic pattern.

The actuator system 110 may include a first actuator 132a, a second actuator 132b, and a third actuator 132c, which are each configured to actuate motion of a respective portion of the member 106. Each of the first actuator 132a, the second actuator 132b, and the third actuator 132c may include a motor 136 having an output shaft 137 and a position encoder 138. The motor 136 may be a rotary electric motor that is configured to rotate the output shaft 137. As an example, the motor 136 may be a stepper motor configured to rotate the output shaft 137 in steps of known angular size. Using the motor 136 thereof, each of the first actuator 132a, the second actuator 132b, and the third actuator 132c is configured to cause movement of the second part 104 relative to the first part 102.

The second part 104 of the device 100 includes a housing 112. The housing 112 may be referred to as an end housing. The housing 112 is configured to support, contain, and interconnect some components of the device 100. Thus, some components of the device 100 are included in the second part 104 of the device 100 and are coupled to the housing 112 of the second part 104. As an example, the housing 112 may be a rigid structure that defines an internal space in which portions of the second part 104 of the device 100 are housed. Portions of some of the components that are included in the second part 104 may be exposed to an exterior of the housing 112 as is appropriate, for example, to allow those components to be viewed or manipulated. In addition, the housing 112 may be coupled to the member 106 in order to the connect the second part 104 to the first part 102 through the member 106.

The second part 104 of the device 100 may include components such as sensors, input devices, and output devices. The second part 104 of the device 100 may include motion sensors 114, a touch sensitive display 116, a loudspeaker 118, a camera 120, and a microphone 122. These components may be conventional. It should be understood that, in alternative implementations, some of these components may be relocated to another portion of the device 100, such as the first part 102, without a change in function.

The controller 108 is configured to communicate (e.g., via wired or wireless connections) with the motion sensors 114, the touch sensitive display 116, the loudspeaker 118, the camera 120, and the microphone 122, allowing the controller 108 to receive inputs from these components and/or to send commands to these components to cause the components to perform various functions. The controller 108 is further configured to communicate with other components that are included in the device 100, as will be discussed further herein.

The device 100 includes the motion sensors 114 (e.g., one or more motion sensors) in order to allow the controller 108 to track the position of the second part 104 with respect to the first part 102. The motion sensors 114 are coupled to the second part 104 and configured to output a motion signal representing movement of the second part 104 relative to the first part 102. The motion sensors 114 may be configured to directly output a measured acceleration of the motion sensor and/or a measured velocity of the motion sensors 114. Acceleration and/or velocity may be measured in three linear directions (e.g., X, Y, and Z directions) and/or in three rotational directions (e.g., pitch, roll, and yaw directions) using suitable components such as a three-axis accelerometer and/or a three-axis rate gyroscope. As an example, each of the motion sensors 114 may be implemented using an inertial measurement unit (IMU). Two or more of the motion sensors 114 may be included in the second part 104 to improve motion tracking performance and allow for better understanding of the movement of the second part 104. The signals from the motion sensors 114 may be combined using geometric techniques and/or filtering techniques. Alternatively, a single motion sensor may be used.

The motion signal output by the motion sensors 114 is received by the controller 108, which is electrically connected to the motion sensors 114. The controller 108 is configured to interpret the motion signal output by the motion sensors 114. In particular, the controller 108 may be configured to analyze the motion signal output by the motion sensors 114 and/or other additional signals that are output by additional sensors and provided to the controller 108. By analyzing one or more of these signals, the controller 108 is able to detect and measure a force applied to the second part 104 and to determine a location of the applied force relative to the second part 104. In addition, the controller 108 determines and tracks multiple positions of the second part 104 over time in order to sense and understand movement. For example, multiple samples obtained over time can be interpreted to determine velocity, displacement, rotation, force, contacts (e.g., one or more contacts by the user with the second part 104), and other motion parameters that describe the motion of the second part 104. Any or all of these characteristics that are included in or determined based on the motion signal may be used as a basis for making determinations (e.g., by the controller 108) in the systems and methods described herein.

The touch sensitive display 116 includes a display screen 124 and a touch input device 126. As an example, the touch input device 126 may be an overlay that is positioned on the display screen 124 such that light emitted by the display screen 124 passes through the touch input device 126. A transparent cover (e.g., formed from plastic or glass) may be placed over the display screen 124 and the touch input device 126 without affecting operation of the touch input device 126. As an example, a transparent cover may define an interaction surface that can be touched by the user and through which touches can be sensed by the touch input device 126 and registered as touch events. In the description herein, contact with a transparent cover or contact with the display screen 124 is equivalent to contact with the touch input device 126, and descriptions of such contact are interchangeable.

The display screen 124 is configured to present visual content to a user. The display screen 124 may be used to present user interface elements, still images, videos, and other visual content. The display screen 124 may be, as examples, a liquid crystal display (LCD), a light-emitting diode (LED) display, an organic light-emitting diode display, or any other suitable type of visual display. The touch input device 126 is a touch sensor panel that is implemented according to touch sensing technologies such as capacitive or resistive touch sensing to perceive touches by a portion of the user's body (e.g., a finger) or by a stylus or other implement. The touch input device 126 outputs a touch signal that represents contact, and the touch signal may be provided to the controller 108 by the touch input device 126. The touch signal may be interpreted to determine characteristics of the contact, such as the position, size, shape, and force associated with the contact. These characteristics may be tracked over time by the controller 108 to detect a gesture that is being made by the user of the device 100 through contact with the touch input device 126.

The display screen 124 and the touch input device 126 of the touch sensitive display 116 are coupled to the housing 112 in a manner that allows viewing of the display screen 124 and user interaction with the touch input device 126. The display screen 124, the touch input device 126, or a transparent cover affixed thereto may be coupled to the housing 112 such that an exterior surface thereof is substantially flush relative to an exterior surface of the housing 112.

The loudspeaker 118 is configured to generate sound, for example, in response to an audio signal provided by the controller 108. The camera 120 may be a digital video camera or a digital still camera configured to output information that, when interpreted, defines one or more digital images (e.g., comprising pixels). The one or more images may be obtained by the camera 120 in response to receiving a command from the controller 108, and the images may be provided (e.g., by a wired signal transmission) to the controller 108 by the camera 120. The microphone 122 is configured to output an audio signal representing sound from the environment around the device 100. The audio signal from the microphone 122 may be provided to the controller 108.

The first part 102 of the device 100 includes a housing 130. The housing 130 may be referred to as a base housing. The housing 130 is configured to support, contain, and interconnect some components of the device 100. Thus, some components of the device 100 are included in the first part 102 of the device 100 and are coupled to the housing 130 of the first part 102. As an example, the housing 130 may be a rigid structure that defines an internal space in which portions of first part 102 are housed. Portions of some of the components that are included in the first part 102 may be exposed to an exterior of the first part 102.

The components of the actuator system 110 may be located in the housing 130. The housing 130 may contain or support additional components, such as a battery, power supply, and/or control elements like buttons or switches for user control. In addition, the housing 130 may be coupled to the member 106 in order to the connect the second part 104 to the first part 102 through the member 106.

Figure 1B:
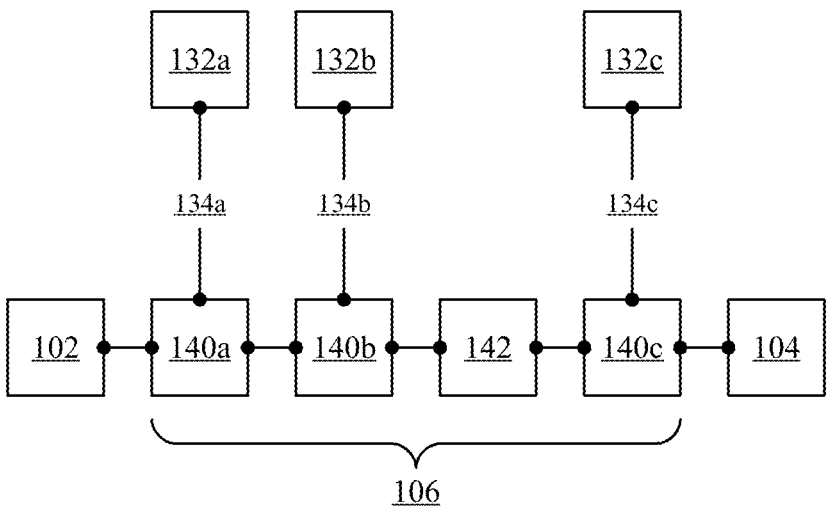
FIG. 1B is a schematic illustration of the device showing connection of a first part to a second part.

FIG. 1B is a schematic illustration of the device 100 showing connection of the first part 102 to the second part 104 by the member 106. The configuration shown in FIG. 1B is an example of a structural configuration that can be used to implement the device 100 and the functionality described herein. It should be understood, however, that the variations of this structural configuration are possible. FIG. 1F is a schematic side-view illustration of the device 100. The configuration shown in FIG. 1F is an example of a structural configuration that can be used to implement the device 100 and the functionality described herein.

The member 106 is configured to support the second part 104 with respect to the first part 102, such as by connection of the member 106 to the housing 112 and to the housing 130. The member 106 may be configured as an arm that includes a first joint 140a, a second joint 140b, a third joint 140c, and a shaft 142, all of which are coupled between the second part 104 and the first part 102 to support the second part 104 with respect to the first part 102 and to allow movement of the second part 104 with respect to the first part 102.

The first actuator 132a is coupled to a portion of the member 106, such as the first joint 140a, by a first drive mechanism 134a. The second actuator 132b is coupled to a portion of the member 106, such as the second joint 140b, by a second drive mechanism 134b. The third actuator 132c is coupled to a portion of the member 106, such as the third joint 140c, by a third drive mechanism 134c. As examples, the first drive mechanism 134a, the second drive mechanism 134b, and the third drive mechanism 134c may each be or include a rigid link, cable system, or other mechanical system that is operable to transfer motion to portions of the member 106. In some implementations, the first drive mechanism 134a, the second drive mechanism 134b, and/or the third drive mechanism 134c may be omitted, such as by integrating the actuator in a respective one of the joints. Thus, the actuator system 110 may be configured to actuate motion of the member 106 using the first actuator 132a, the second actuator 132b, and the third actuator 132c in response to commands received from the controller 108 in order to adjust the orientation of the second part 104 relative to the first part 102.

Figure 1C:
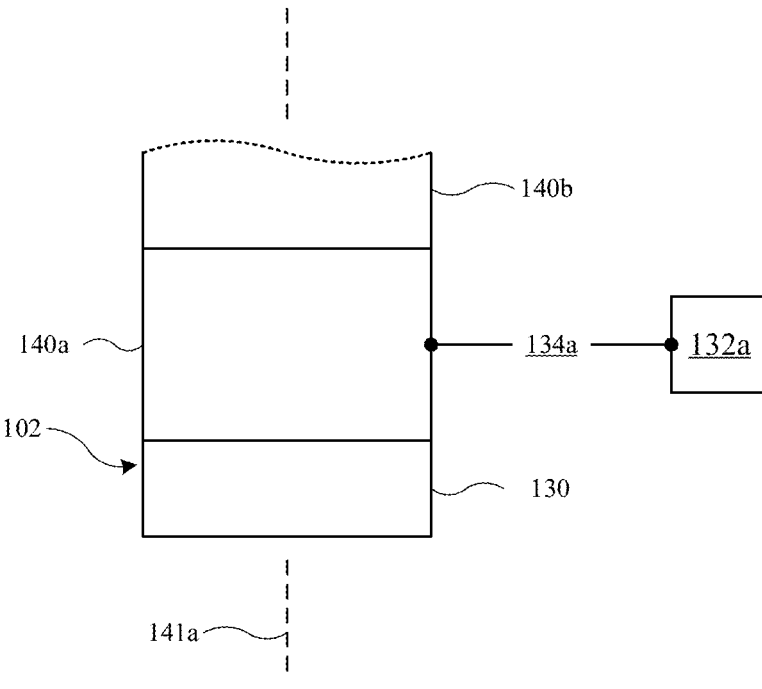
FIGS. 1C-1E are schematic illustrations showing connectors that allow movement of the second part with respect to the first part.

As shown in FIG. 1C, the first joint 140a is a pivot joint that is coupled to the first part 102 and the second joint 140b to allow rotation of the member 106 with respect to the first part 102 around a first axis 141a, thereby defining a first rotational degree of freedom for movement of the second part 104 with respect to the first part 102. As an example, the first axis 141a may be oriented such that it is orthogonal to a bottom surface or top surface of the second part 104. Thus, for example, if the first part 102 is supported by a surface (e.g., a counter), the first axis 141a may extend generally orthogonal to and upward from the surface.

Because the first joint 140a connects the remainder of the member 106 to the first part 102, rotation at the first joint 140a rotates the second joint 140b, the third joint 140c, the shaft 142 and the second part 104 around the first axis 141*a* with respect to the first part 102. Because the first joint 140*a* is coupled to the first part 102, a first portion of the first joint 140*a* may be fixed to the first part 102 and a second portion of the first joint 140*a* may be rotatable with respect to the first part 102. In some implementations, the first portion of the first joint 140*a* is coupled to an internal structure (e.g., a frame) of the first part 102, and the second portion of the first joint 140*a* may be coupled to the housing 130, such that the housing 130 rotates when the first joint rotates. In another implementation, the housing 130 may include a first portion and a second portion, where the first portion of the housing is fixed relative to an internal structure of the first part 102 and the second portion of the housing 130 is rotatable with respect to the first portion of the housing 130 and rotates with the first joint 140*a*.

Figure 1D:
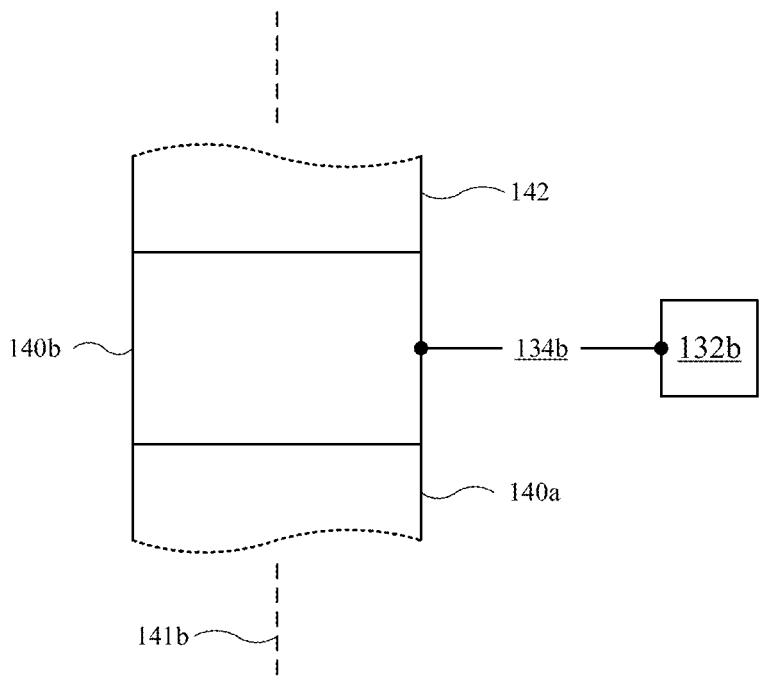

As shown in FIG. 1D, the second joint 140*b* is a pivot joint that is included in the member 106 to allow rotation of a portion of the member 106 around a second axis 141*b*, which is oriented differently (e.g., not along the same axis) than the first axis 141*a*, thereby defining a second rotational degree of freedom for movement of the second part 104 with respect to the first part 102. As an example, the second axis 141*b* may be oriented such that it is perpendicular to the first axis 141*a*. Other implementations are possible. The second joint 140*b* is connected to the first joint 140*a* and is connected to the shaft 142 to allow rotation of the shaft 142 relative to the first joint 140*a* around the second axis 141*b*. The second joint 140*b* may include a first portion that is coupled to the first joint 140*a*, and a second portion that is coupled to the shaft 142 in order to allow rotation of the shaft 142 relative to the first pivot joint 140*a* around the second axis 141*b*.

Figure 1E:
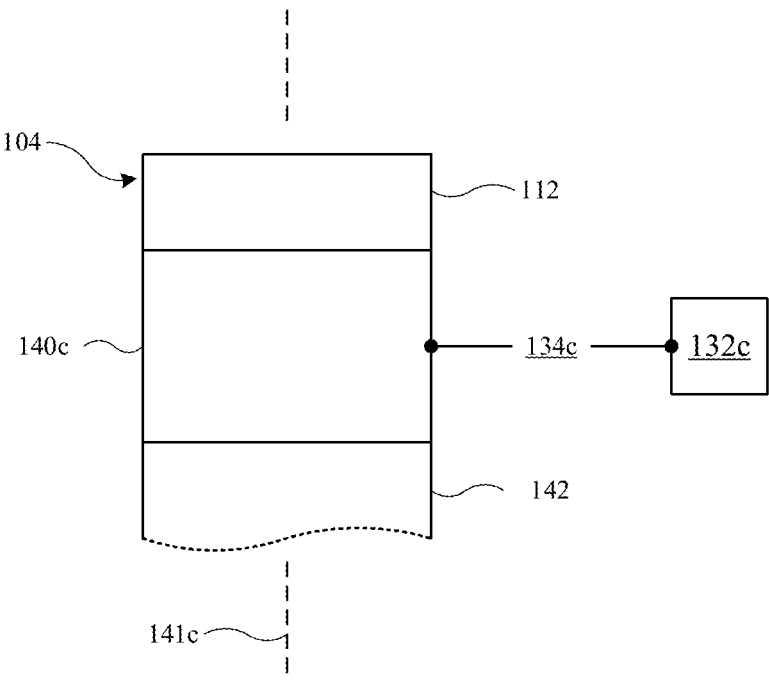
Figure 1F:
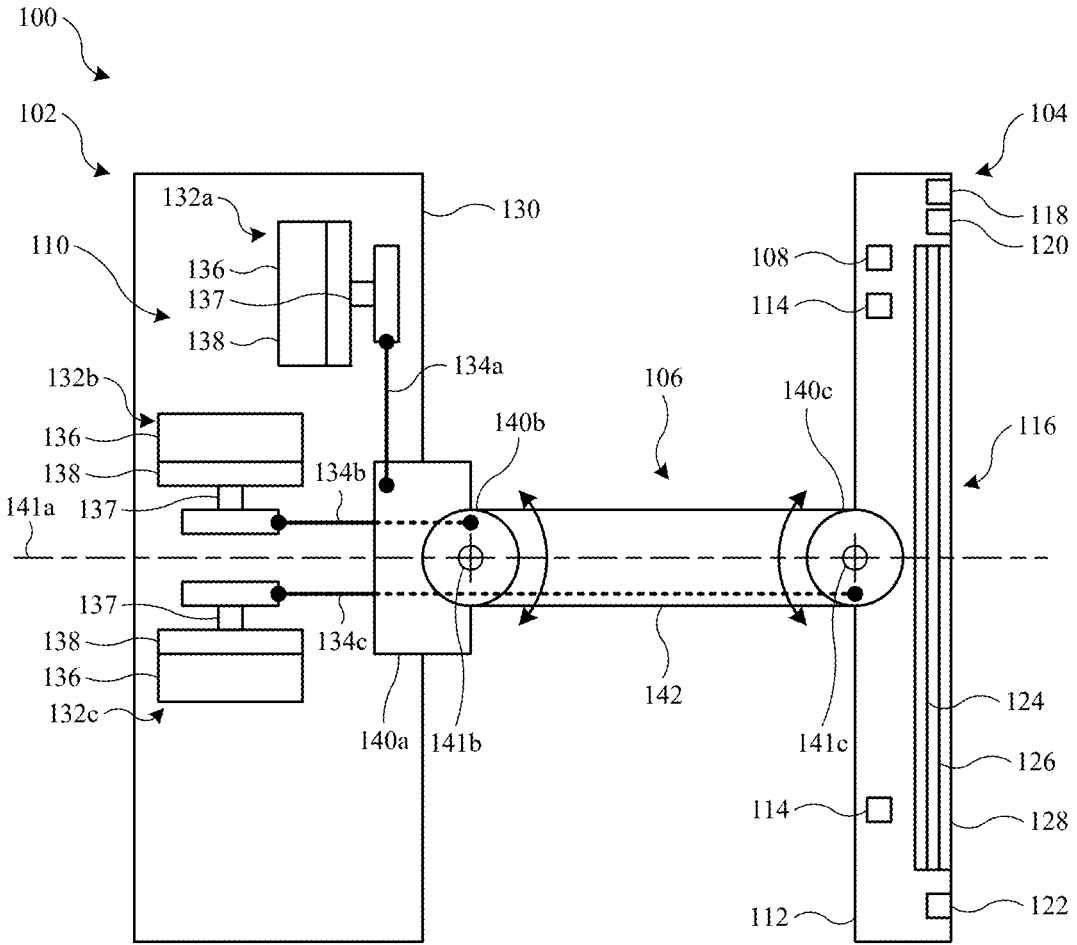
FIG. 1F is a schematic side-view illustration of the device.

As shown in FIG. 1E, the third joint 140*c* is a pivot joint that is included in the member 106 to allow rotation of the second part 104 with respect to the member 106 around a third axis 141*c*, which is oriented differently (e.g., not along the same axis) than the first axis 141*a* and the second axis 141*b*, thereby defining a third rotational degree of freedom for movement of the second part 104 with respect to the first part 102. As an example, the third axis 141*c* may be generally parallel to but spaced from (e.g., not axially aligned with) the second axis 141*b*. The third joint 140*c* is connected to the shaft 142 and is connected to the second part 104 to allow rotation of the second part 104 relative to the shaft 142 around the third axis 141*c*. The third joint may include a first portion that is coupled to the shaft 142 and a second portion that is coupled to the second part 104, such as by connection to an internal structure thereof, to the housing 112, or to a portion of the housing 112.

The shaft 142 extends between the first joint 140*a* and the second joint 140*b*. The second joint 140*b* couples the shaft 142 to the first joint 140*a* for rotation of the shaft 142 and the second part 104 with respect to the first part 102 around the second axis 141*b*. The third joint 140*c* couples the shaft 142 to the second part 104, for rotation of the second part 104 with respect to the shaft 142 around the third axis 141*c*.

In some implementations, the first joint 140*a*, the second joint 140*b*, and/or the third joint 140*c* may each allow rotation in one, two, or three degrees of rotational freedom. Examples of suitable rotational joints may include revolute joints, ball joints, and gimbal joints. In some implementations, one or more of the first joint 140*a*, the second joint 140*b*, and/or the third joint 140*c* may be configured as translational joints, allowing for movement of the second part 104 with respect to the first part 102 in one, two, or three degrees of translational freedom. Examples of suitable translational joints include sliding joints, prismatic joints, and screw joints. In some implementations, the member 106 may include one or more rotational joints in combination with one or more translational joints. To actuate this movement, the motor 136 of each of the first actuator 132*a*, the second actuator 132*b*, and the third actuator 132*c* may be connected to a respective portion of the member 106 by a respective one of the first drive mechanism 134*a*, the second drive mechanism 134*b*, and the third drive mechanism 134*c* and to a respective one of the first joint 140*a*, the second joint 140*b*, and the third joint 140*c* to cause movement of the second part 104 relative to the first part 102. As an example, the motor 136 of the first actuator 132*a* may be coupled to the first joint 140*a*, the motor 136 of the second actuator 132*b* may be coupled to the second joint 140*b*, and the motor 136 of the third actuator 132*c* may be coupled to the third joint 140*c*.

The motor 136 of each of the first actuator 132*a*, the second actuator 132*b*, and the third actuator 132*c* is configured to operate according to a motor control signal output by the controller 108, enabling the second part 104 to reach a desired position relative to the first part 102. For example, the control signal may adjust the operation of the motor 136 to achieve a desired angular position, velocity, or torque. The controller 108 may control motion of the second part 104 using the position signal from the position encoder 138, and/or other signals, such as the motion signal from the motion sensors 114. Signals may be combined using methods such as filtering.

The position encoder 138 is configured to output a position signal representing movement of the motor 136, such as the angular position, change in position, velocity, and/or acceleration of the output shaft 137 of the motor 136. The position signal is output by a sensing mechanism of the position encoder 138, such as an optical, magnetic, or capacitive sensing mechanism. The position signal that is output to by the position encoder 138 is provided to the controller 108. Thus, using the position signal from the motor 136 associated with a respective one of the first actuator 132*a*, the second actuator 132*b*, and the third actuator 132*c*, the positions of the first joint 140*a*, the second joint 140*b*, and the third joint 140*c* can be tracked to allow determination of the position of the second part 104 with respect to the first part 102, for example, by geometric techniques.

While the member 106 includes one shaft and three joints in the illustrated implementation, it should be understood that additional shafts and/or joints may be included to change the range of motion of the member 106 and/or to add additional degrees of freedom in which the position of the second part 104 with respect to the first part 102 may be controlled. In such implementations, corresponding actuation components, such as additional actuators of the actuator system 110, may be included to cause motion of these portions of the member 106.

The controller 108 is configured to detect and interpret a gesture that is applied to the second part 104 and sensed by the touch input device 126, for example, when a portion of the device 100 corresponding to the touch input device 126 is touched by a user's finger. The touch input device 126 may be configured to output a signal representing characteristics of the gesture, such as the position, shape, size, and/or force associated with the gesture. The signal output by the touch input device 126 is interpreted by the controller 108 to identify these characteristics, use them to determine a user intention, and, in some cases, pass information representing the touch input to an application of the device 100, such as an operating system application or a non-operating system application of the device 100. As an example, signals representing gestures may be passed to applications in the form of event messages.

The position of the second part 104 with respect to the first part 102 changes during use of the device 100. As one example, the position of the second part 104 may be changed by operation of the motor 136 of each of the first actuator 132a, the second actuator 132b, and the third actuator 132c in response to commands received by the motor 136 from the controller 108. As another example, the user may manually manipulate the second part 104 to change the position of the second part 104 with respect to the first part 102, such as by grasping the second part 104 and pushing, pulling, twisting, or otherwise manipulating it in order to reposition the second part 104 with respect to the first part 102. The controller 108 is configured to track the position, velocity, and/or acceleration of the second part 104 with respect to the first part 102 in order to allow control of positioning of the second part 104 and in order to allow control of force feedback and haptic effects. The controller 108 may also use the tracked position, velocity, and/or acceleration of the second part 104 with respect to the first part 102 in order to determine whether to transition operation of the device 100 between control modes that change how the device 100 reacts to attempts, by the user, to manually reposition the second part 104 with respect to the first part 102.

The controller 108 may be configured to determine a position of the second part 104 with respect to the first part 102 using the motion sensors 114. In one implementation, the controller 108 utilizes the motion signal output by the motion sensors 114. As an example, starting from a known position and velocity (e.g., a home position and zero velocity), acceleration values output as part of the motion signal from the motion sensors 114 may be integrated over time to determine a change in velocity of the second part 104 with respect to one or more linear and/or rotational degrees of freedom, allowing the current velocity of the second part 104 to be tracked over time. Similarly, the velocity of the second part 104 may be integrated over time to determine a change in position of the second part 104 with respect to one or more linear and/or rotational degrees of freedom, thereby allowing the position of the second part 104 with respect to the first part 102 to be tracked over time based on the motion signal output by the motion sensors 114.

The controller 108 may be configured to determine a position of the second part 104 with respect to the first part 102 using the position encoder 138 of each of the first actuator 132a, the second actuator 132b, and the third actuator 132c. Starting from a known position, the position signal output by the position encoder 138 is monitored to determine a change in position of the second part 104 with respect to the first part 102. As an example, the controller 108 may use a predetermined relationship between the position signal output by the position encoder 138 and the corresponding change in position of the second part 104 with respect to the first part 102. As examples, the predetermined relationship may be a ratio, a formula, a look up table, or other manner of information. Based on the change in position of the second part 104 with respect to the first part 102 during a time period, the change in velocity of the second part 104 with respect to the first part 102 can be determined as the first derivative of the change in position and the change in acceleration of the second part 104 with respect to the first part 102 can be determined as the second derivative of the change in position.

In implementations with multiple motors that are each associated with a corresponding position encoder and which each activate a different motion (e.g., degree of freedom) of the second part 104 with respect to the first part 102 (e.g., such as the motor 136 and the position encoder 138 of each of the first actuator 132a, the second actuator 132b, and the third actuator 132c), the position signals output by all such position encoders may be utilized by the controller 108 to determine the change in position of the second part 104 with respect to the first part 102 in the same manner.

The controller 108 may be further configured to track the position, velocity, and/or acceleration of the second part 104 with respect to the first part 102 by combining the information output by the motion sensors 114 and the position encoder 138 of each of the first actuator 132a, the second actuator 132b, and the third actuator 132c. As an example, a first position estimate for the second part 104 with respect to the first part 102 may be determined using the motion signal from the motion sensors 114, a second position estimate for the second part 104 with respect to the first part 102 may be determined using the position signal from the position encoder 138 of each of the first actuator 132a, the second actuator 132b, and the third actuator 132c. The first position estimate and the second position estimate are combined by the controller 108 using a suitable method, such as a filtering algorithm.

The controller 108 may further be configured to determine a direction of a force applied to the second part 104 by the user. As an example, changes in position determined using the motion signal from the motion sensors 114, and/or using the position signal from the position encoder 138 of each of the first actuator 132a, the second actuator 132b, and the third actuator 132c may be used to determine the direction of the applied force according to the change in velocity or position of the second part 104. The magnitude of the applied force may then be estimated by mathematical methods based on the change in velocity, the mass of portions of the device 100, friction values associated with the member 106, and forces applied by the actuator system 110, which can be estimated based on current draw of the first actuator 132a, the second actuator 132b, and the third actuator 132c, which is proportional to actuator torque.

Figure 2:
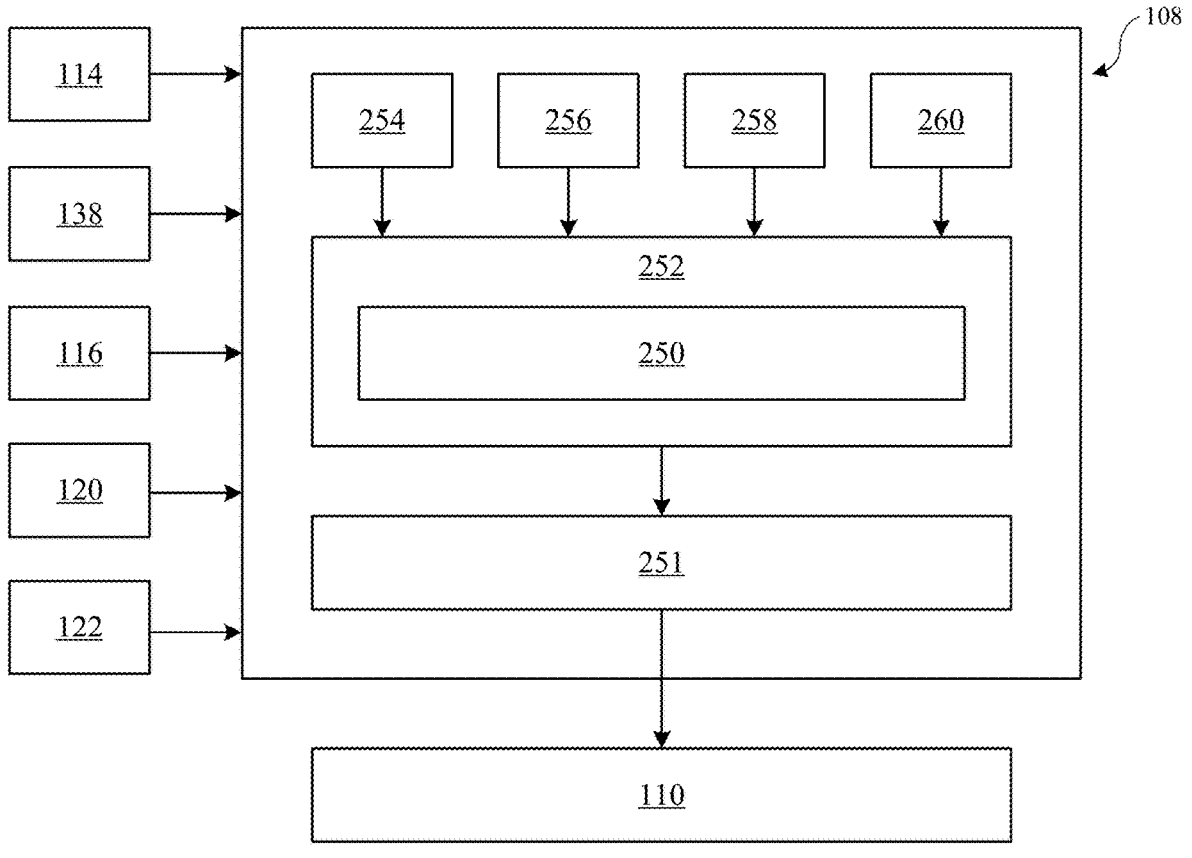
FIG. 2 is a block diagram illustrating force feedback control.

FIG. 2 is a block diagram illustrating control of the actuator system 110 of the device 100 by the controller 108. The controller 108 of the device 100 is configured to control operation of the actuator system 110 to apply force feedback effects to the second part 104 when the user attempts to manually reposition the second part 104 with respect to the first part 102. The controller 108 may be configured to apply force feedback effects to the second part 104 by determination of a feedback force 250. The feedback force 250 is used to control operation of the actuator system 110 by transmission of a feedback command 251 to the actuator system 110, where the feedback command 251 is based on the feedback force 250 and is configured to cause the actuator system 110 to apply the feedback force in opposition to an external force that is applied to the second part 104 by the user. The feedback force 250 may be applied along a single direction relative to the second part 104, such as along a first axis corresponding to a height dimension of the second part 104, along a second axis corresponding to a width dimension of the second part 104, or along a third axis corresponding to a depth direction of the second part 104, where the first axis, the second axis, and the third axis are orthogonal to each other. In addition, the feedback force 250 may be applied along two of or all three of the first axis, the second axis, and the third axis, and the magnitude of feedback force 250 applied to the axes may be the same or may be different.

The controller 108 uses information received from various components of the device 100 to determine how to control the actuator system 110. The inputs received by the controller 108 may include the motion signals from the motion sensors 114, the position signals from the position encoders 138 of each of the first actuator 132a, the second actuator 132b, and the third actuator 132c, and/or current draw values for each of the first actuator 132a, the second actuator 132b, and the third actuator 132c. The inputs received by the controller 108 and used to control the actuator system 110 may also include touch signals from the touch input device 126 of the touch sensitive display 116, one or more images from the camera 120, and/or audio captured by the microphone 122.

The controller 108 may include a feedback determiner 252 that is configured to determine the feedback force 250 and to output the feedback command 251. The feedback determiner 252 may be implemented in the form of computer program instructions that are provided to the controller 108 and executed by the controller 108 to determine a magnitude and direction of force feedback to be applied by the actuator system 110, and this information is utilized to define the force feedback command in a manner that will cause the actuator system 110 to operate in a manner that applies force feedback to the second part 104 according to the determined magnitude and direction.

The feedback force 250 may be determined using inputs including a current position 254, a repositioning force 256, a target position 258, and a feedback profile 260. As an example, the controller 108 may determine the feedback force 250 in order to vary the feedback force 250 in accordance with a position of the second part 104 with respect to the target position 258. The relationship between the feedback force 250 and the position and/or direction of the second part 104 relative to the target position 258 may be defined by the feedback profile 260. The repositioning force 256 may also be used to determine the feedback force 250, such as by scaling the magnitude of the feedback force 250 as a function of the repositioning force 256, so that a forceful movement of the second part 104 by the user causes an increase to the magnitude of the feedback force 250 in order to provide an appropriate level of force feedback to the user.

To apply force feedback to the second part 104 based on the feedback force 250, the feedback command 251 is provided to the actuator system 110, for example in the form of one or more signals that are configured to cause the first actuator 132a, the second actuator 132b, or the third actuator 132c to operate in a desired manner. In response to the feedback command 251, the actuator system 110 may apply the feedback force 250 to the second part 104.

The current position 254 includes information representing the position of the second part 104 with respect to the first part 102. The current position 254 may be determined by tracking the position of the second part 104 over time relative to a known starting position of the second part 104, which may be a home position (e.g., determined by a sensor) or may be calibrated. The position of the second part 104 can be determined in the manner previously described, such as by using the motion signals from the motion sensors 114 and/or the position signals from the position encoders 138 of the actuator system 110.

The repositioning force 256 includes information (e.g., a numerical value) that represents a direction and/or a magnitude of a force (e.g., an external force) applied to the second part 104 by the user. As an example, the repositioning force 256 may include a value that represents the magnitude of the force applied to the second part 104 by the user and may also include information that identifies a direction along which the force is applied. The magnitude and/or direction of the repositioning force 256 may be determined mathematically in the manner previously described. As examples, the repositioning force 256 may be determined based on the motion signals from the motion sensors 114, based on the position signals from the position encoders 138 of the actuator system 110, based on current draw by the actuators of the actuator system 110, and/or based on other information that is available to the controller 108.

In one example, the direction of the repositioning force 256 is described by an angle in three degrees of freedom relative to the second part 104, relative to the first part 102, or relative to another frame of reference. Alternatively, the direction along which the force is applied may correspond to a single axis of movement of the second part 104 with respect to the first part 102, or to two or more axes of movement of the second part 104 with respect to the first part 102. In one implementation, the repositioning force 256 describes the magnitude of the repositioning force applied by the user separately with respect to one or more linear degrees of freedom and/or one or more rotational degrees of freedom.

The feedback determiner 252 utilizes the target position 258 to determine the feedback force 250 that is to be applied to the second part 104 by applying the feedback profile 260 at the target position 258. The target position 258 represents a position and/or orientation of the second part 104 with respect to the first part 102 that the user may want to move the second part 104 to. The feedback profile may be configured to make it easier for the user to place the second part 104 in the position and/or orientation corresponding to the target position 258. Thus, using the target position 258 and the feedback profile 260, the feedback determiner 252 may be configured to determine the feedback force 250 in a manner that helps the user position the second part 104 of the device 100 according to the target position 258. Although the term "target position" is used herein in the singular form, it should be understood that there may be several such positions for the second part 104 with respect to the first part 102, and the feedback force 250 may be determined in a similar manner with respect to all of them.

In one example, the target position 258 may be a predetermined position, such as a default position or home position for the second part 104 with respect to the first part 102. Thus, for example, the target position 258 may be specified as a particular predetermined angular orientation for the second part 104 relative to the first part 102 with reference to one or more of the first axis 141a, the second axis 141b, and the third axis 141c. In an implementation in which multiple target positions 258 are used, they may be set at predetermined angular spacings, such as by defining an array of the target positions 258 around the first axis 141a at consistent angular spacings with respect to each other, such as ninety-degree angular spacings.

In another example, the target position is determined by a software application that is executed by the controller 108. As an example, the application may generate content (e.g., images), and allow the user to interact with the content by changing a view of the content (e.g., by changing a virtual camera position relative to a 3D scene, scrolling relative to 2D content, and so forth) in correspondence with repositioning of the second part 104 with respect to the first part 102. In this example, the application may designate certain portions of the content as positions of interest, and define the target position 258 such that it corresponds to a position of the second part 104 at which one of the positions of interest in the content is moved to a predetermined position relative to the display screen 124, such as a centered position on the display screen 124.

In another example, the target position 258 is determined using images that depict the environment around the device 100. The images are obtained by the camera 120, which may be coupled to the second part 104 as previously described. In this example, the images (or content derived therefrom) are displayed to the user by the display screen 124 of the device 100 substantially contemporaneously to capture of the images by the camera 120. Thus, in implementations in which the camera 120 is coupled to the second part 104, moving the second part 104 with respect to the first part 102 also moves the camera 120, thereby changing the field of view of the camera 120 and accordingly changing the content that is output to the display screen 124 based on the images.

In this implementation, the target position 258 may be determined according to a position of an entity detected using the camera 120. As examples, the entity may be the user of the device, the entity may be another person that is visible in the images, or the entity may be an object that is present in the images. To detect the entity, the controller 108 may analyze the images obtained by the camera 120 using machine vision techniques including image segmentation algorithms, image feature recognition algorithms, trained neural networks, and so forth. In this manner, the positions of one or more entities in the images may be identified as positions of interest, and, for example, the controller 108 may define a group of positions of interest that each represent one of the entities that is detected by the camera 120 with a current field of view of the camera 120. The target position 258 may then be selected by the controller 108 from the group of positions of interest. For example, the target position 258 may be set, by the controller 108, to a position corresponding to a closest one of the positions of interest. The controller 108 may set the coordinates for the target position in a manner that will place the entity from the position of interest at a predetermined location relative to the display screen 124, such as a centered position relative to the display screen 124, when the second part 104 is moved to the target position 258, which in this example occurs while the images from the camera 120 (or content derived therefrom) is shown on the display screen 124.

In the previous example, the target position 258 is set by identifying objects within the field of view of the camera 120. This may occur, for example, while the second part 104 remains stationary relative to the first part 102, or while the second part 104 is being repositioned by the user (e.g., the second part 104 is moving in response to an external force that is applied to the second part 104 manually by the user). In another example, the device 100 may attempt to identify additional entities that are not currently within the field of view of the camera 120, by using the actuator system 110 to move the second part 104 with respect to the first part 102. To do so, the device 100 may start obtaining images using the camera 120 with the second part 104 at a first position, and continue obtaining images using the camera 120 during movement of the second part 104 from the first position to a second position. Two or more of the images obtained during movement of the second part 104 from the first position to the second position have different fields of view (e.g., the two fields of view are at least partially nonoverlapping). These images are then analyzed to identify one or more entities and corresponding ones of the target positions 258 in the manner previously described with respect to analysis of a current field of view of the camera 120. Thus, in this example, the target position 258 may be selected from a group of positions of interest that each represent an entity that is detected by the camera 120 during movement of the second part 104 with respect to the first part 102.

In a further example, identifying multiple entities around the device 100 by moving the second part 104 and the camera 120 while obtaining images may include control of the actuator system 110 by the controller 108 to rotate the second part 104 through rotation of three hundred and sixty degrees with respect to the first part 102, while obtaining two or more images that have different fields of view. The two or more images, together, may define a combined field of view of three hundred and sixty degrees around the device 100. These images are then analyzed to identify one or more entities and corresponding ones of the target positions 258 in the manner previously described with respect to analysis of a current field of view of the camera 120. Thus, in this example, the target position 258 may be selected from a group of positions of interest that each represent an entity that is detected by the camera 120 during rotation of the second part 104 with respect to the first part 102.

In another implementation, the target position 258 may be determined using the images from the camera 120 and an input that identifies an entity (e.g., a person or an object) that is visible in the images. As previously described, the camera 120 obtains images of the environment around the device 100. The controller 108 obtains an input that identifies an entity in the images obtained by the camera 120. As an example, the entity may be identified by its name. The input may be made, for example, by the user with an input device that is associated with the device 100, such as the camera 120, the microphone 122, the touch input device 126, or another input device. As one example, the input may be a spoken command that is uttered by the user and refers to an entity in the images, and the spoken command may be interpreted by the controller 108 using a speech-to-text algorithm to obtain a text representation of the name of the object for use in identifying the entity in the images. Using the input, such as the name of the entity, one or more of the images from the camera 120 are analyzed, according to machine vision techniques, to identify the position of the entity in the images according to the name of the entity.

The target position 258 may then be set according to the entity position as previously described, such as by setting the target position 258 such that the entity corresponding to the target position will be centered in the images obtained by the camera 120 and/or displayed on the display screen 124 when the second part 104 is moved to the target position 258. The controller 108 may then determine the feedback force 250 and output the feedback command 251 in a manner that varies the feedback force in accordance with a position of the second part 104 with respect to the target position 258 and/or in accordance with a direction of the second part 104 with respect to the target position 258.

The feedback profile 260 describes a magnitude of the force feedback to be applied to the second part 104 in response to the repositioning force applied by the user as a function of the current position 254 of the second part 104 relative to the target position 258 and/or as a function of the direction of the repositioning force 256 applied to the second part 104 by the user. The feedback profile 260 may be described by a list of force values versus relative position values, as a mathematical function, as a logical function, as an algorithm, or in any other suitable manner.

In an implementation in which the feedback force 250 is applied along a single axis (e.g., a first axis), the feedback profile 260 may be a relationship between the position of the second part 104 along the first axis and the magnitude of the feedback force 250. In this implementation, the actuator system 110 is controlled by the controller 108 such as by transmission of the feedback command 251, to apply the feedback force to the second part 104 along a first axis in response to the repositioning force 256 applied to the second part 104 by the user. In this implementation, the magnitude of the feedback force 250 to be applied along the first axis is determined using the feedback profile 260, based on the distance between the current position 254 of the second part 104 and the target position 258 for the second part 104. In an implementation in which the feedback force 250 is applied along two or more axes (e.g., along a first axis and a second axis), the feedback profile 260 may include a relationship between the position of the second part 104 with respect to the two or more axes and the magnitude of the feedback force 250. In this implementation, the feedback force 250 may be applied to the respective axes independently by the actuator system 110, such as by applying the feedback force 250 according to a different magnitude along each of the axes.

In one example, the feedback profile 260 may specify that the feedback force 250 has a first magnitude if a direction of the repositioning force 256 is in a first direction that corresponds to movement toward the target position, and that the feedback force 250 has a second magnitude if the direction of the repositioning force 256 is in a second direction that corresponds to movement away from the target position 258. Thus, the feedback force 250 may be higher when the repositioning force 256 is applied to move the second part 104 away from the target position 258 than when the repositioning force 256 is applied to move the second part 104 toward the target position 258. Alternatively, the feedback force 250 may be higher when the repositioning force 256 is applied to move the second part 104 toward the target position 258 than when the repositioning force 256 is applied to move the second part 104 away from the target position 258.

In another example of the feedback profile 260, the feedback force 250 may decrease as the distance between the current position 254 of the second part 104 and the target position 258 decreases, and the feedback force 250 may increase as the distance between the current position of the second part 104 and the target position 258 increases. In another example of the feedback profile 260, the feedback force 250 may increase as the distance between the current position 254 of the second part 104 and the target position 258 decreases, and the feedback force 250 may increase as the distance between the current position of the second part 104 and the target position 258 increases.

Figure 3A:
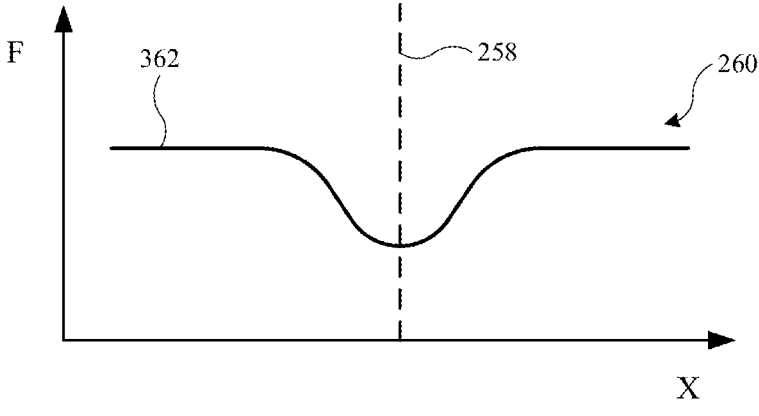
FIGS. 3A-3B show examples of feedback profiles.
Figure 3B:
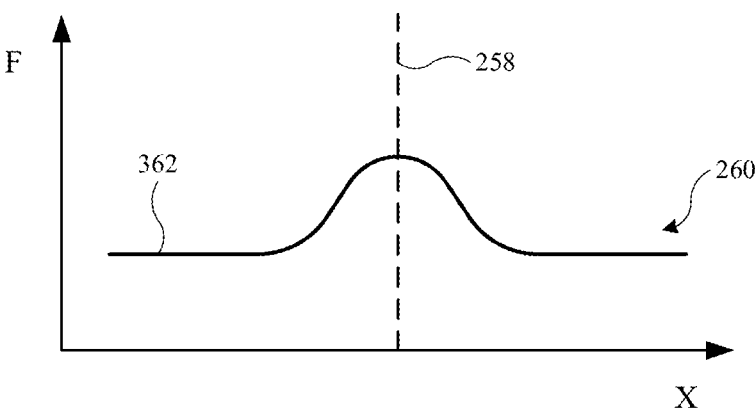

A first example of the feedback profile 260 is shown in FIG. 3A, in which a force F indicated by the feedback profile 260 is dependent on the position of the second part 104 along an axis X relative to the target position 258. In the example of FIG. 3A, a nominal force value 362 is indicated at locations that are spaced from the target position 258, and the value of the force F indicated by the feedback profile 260 is lower than the nominal force value 362 at the target position 258, as it decreases progressively relative to the nominal force value 362 as the current position 254 of the second part 104 along the axis X approaches the target position 258. A second example of the feedback profile 260 is shown in FIG. 3B in which the force F indicated by the feedback profile 260 is dependent on the position of the second part 104 along the axis X relative to the target position 258. In the example of FIG. 3B, the nominal force value 362 is indicated at locations that are spaced from the target position 258, and the value of the force F indicated by the feedback profile 260 is higher than the nominal force value 362 at the target position 258, as it increases progressively relative to the nominal force value 362 as the current position 254 of the second part 104 along the axis X approaches the target position 258. It should be understood that the feedback profiles 260 depicted in FIGS. 3A-3B are simplified examples, and other relationships between position and force may be used.

Figure 4:
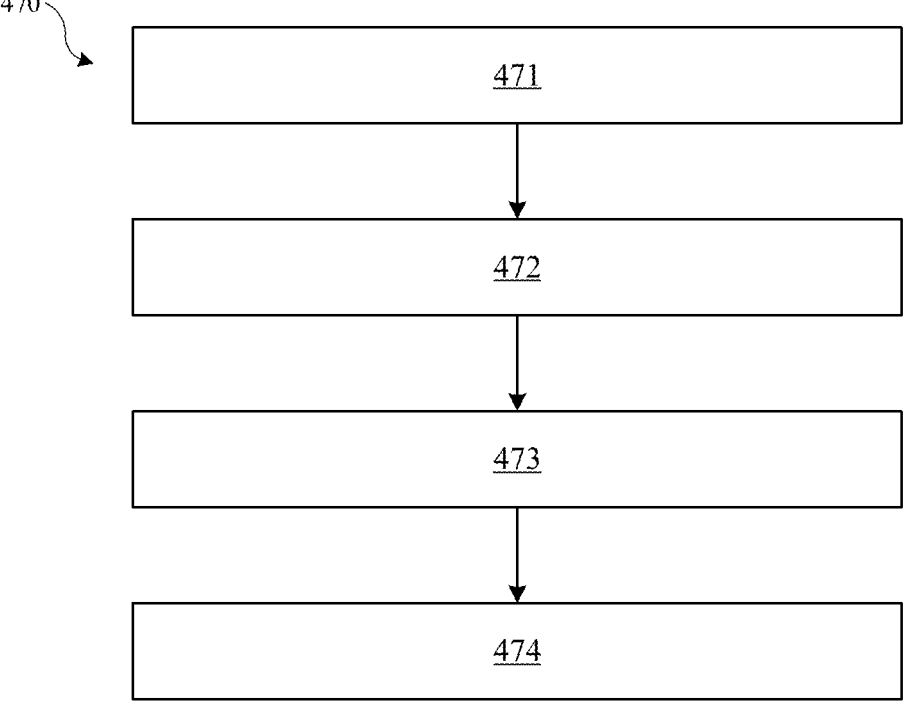
FIG. 4 is a block diagram of a feedback control process.

FIG. 4 is a block diagram of a force feedback control process 470. The force feedback control process 470 may be performed using the device 100, as previously described, such as an implementation of the device 100 that includes the second part 104, the first part 102, the member 106, the controller 108, and the actuator system 110. The force feedback control process 470 may be implemented, for example, in the form of computer program instructions that are executable by a computing device (e.g., comprising one or more processors and a memory to store the computer program instructions), such as the controller 108. The program instructions may be embodied in the form of a non-transitory computer-readable storage device, or in another suitable form.

Operation 471 includes determining the current position 254 of the second part 104 of the device 100. The current position 254 of the second part 104 may be determined in the manner previously described. As an example, the current position 254 of the second part 104 of the device 100 may be determined using the position signals output by the position encoders 138 of the actuator system 110. As an example, the current position 254 of the second part 104 of the device 100 may be determined using the motion signals output by the motion sensors 114. As an example, the current position 254 of the second part 104 with respect to the device 100 may be determined using the position signals and the motion signals, which may be combined using filtering or another suitable method.

Operation 472 includes determining the target position 258 for the second part 104 of the device 100 with respect to the first part 102 of the device 100. Determination of the target position 258 can be performed in the manner previously described. As examples, the target position 258 may be a predetermined position, the target position 258 may be determined by a software application based on content generated by the software application, or the target position 258 may be determined based on images output by the camera 120 by identifying entities present in the images, or the target position 258 may be determined by receiving a user input that indicates an entity present in the images obtained by the camera 120.

Thus, in some implementations, operation 472 includes obtaining images of an environment around the device 100 using the camera 120 that is coupled to the second part 104 of the device 100. In such implementations, operation 472 may further include detecting an entity using the images from the camera 120 and determining the target position 258 according to a position of the entity.

Operation 473 includes determining the feedback force 250 based on the current position 254 of the second part 104 and the target position 258 for the second part 104. As an example, operation 473 may include comparing the current position 254 of the second part 104 to the target position 258 for the second part 104. This comparison may include determination of a distance between the current position 254 of the second part 104 and the target position 258 for the second part 104. The feedback force 250 may be determined based on the current position 254 of the second part 104 relative to the target position 258 using the feedback profile 260, in the manner previously described. The feedback force 250 may be determined for a single axis, or with respect to two or more axes of motion relative to the second part 104 of the device 100.

In operation 474, the feedback force 250 is applied to the second part 104 of the device 100. The feedback force 250 may be applied using the actuator system 110 and may be applied with respect to a single axis or two or more axes of motion relative to the second part 104 of the device 100. Thus, for example, the actuator system 110 may be configured to apply a first feedback force along a first axis relative to the second part 104 of the device 100, and the actuator system 110 may be further configured to apply a second feedback force along a second axis relative to the second part 104 of the device 100.

In some implementations, the force feedback control process 470 includes sensing an external force that is applied to the second part 104, such as the repositioning force 256, and determining whether a direction of the external force corresponds to movement of the second part 104 away from the target position 258 or movement of the second part 104 toward the target position 258. In this implementation, the feedback force may be applied according to a first magnitude in response to determining that the direction of the external force corresponds to movement of the second part 104 away from the target position 258, and the feedback force 250 may be applied according to a second magnitude in response to determining that the direction of the external force corresponds to movement of the second part 104 toward the target position 258. These forces may be determined using the feedback profile 260, as previously described, or in another suitable manner. As one example, the first magnitude of the feedback force 250 may be higher than the second magnitude of the feedback force 250. As another example, the first magnitude of the feedback force 250 may be lower than the second magnitude of the feedback force 250.

Figure 5:
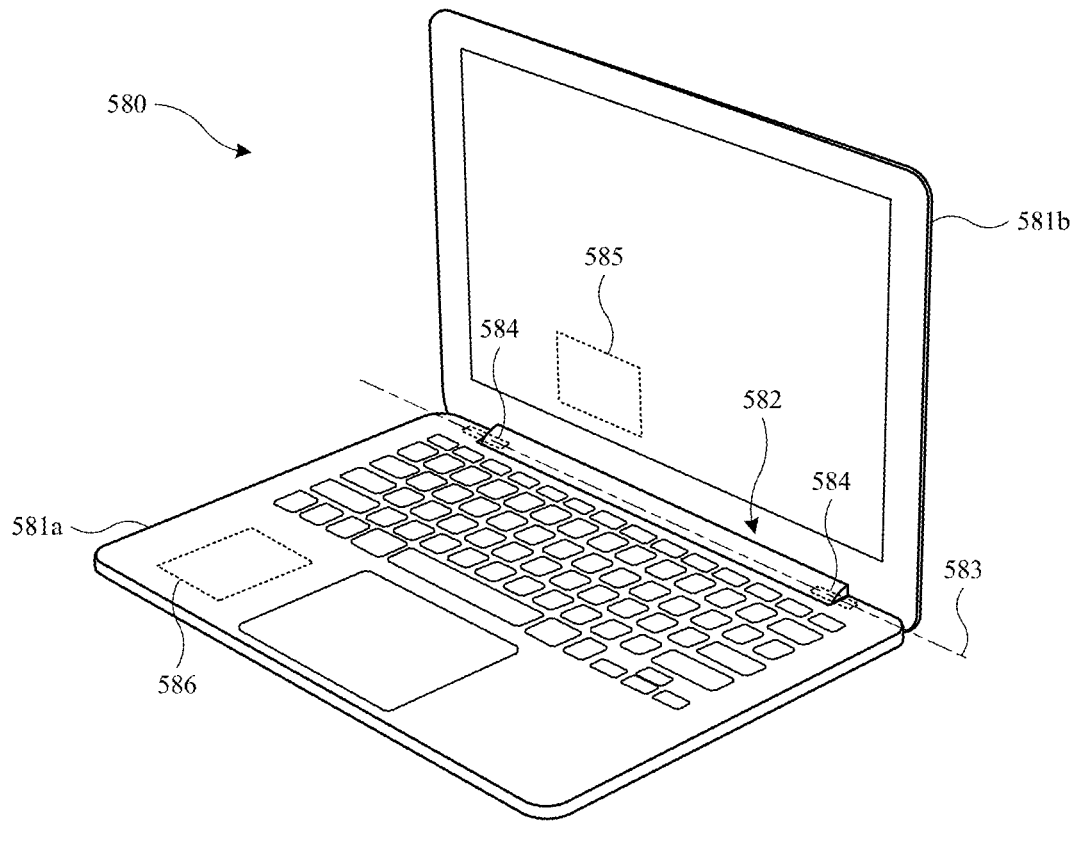
FIG. 5 is an illustration of a device according to an example.

It should be understood that the force feedback control process 470 may be implemented in the context of many different types of devices. FIG. 5 is an illustration of a device 580 according to an example, where the device 580 is a laptop computer having a first device portion 581*a* and a second device portion 581*b* that are connected to each other by a hinge 582 to allow rotation of the second device portion 581*b* with respect to the first device portion 581*a* around an axis 583. The axis 583 may be referred to as a rotation axis. The first device portion 581*a* is a main portion of the laptop computer, and may include a system board, a processor, a battery, a keyboard, and other components. The second device portion 581*b* is a lid of the laptop computer and may include a display screen and other components.

The hinge 582 allows pivoting movement of the second device portion 581*b* with respect to the first device portion 581*a* about the axis 583, which may include movement between an open position and a closed position. In this implementation, the hinge 582 serves as a member that connects the first device portion 581*a* of the device 580 to the second device portion 581*b* of the device 580 to allow movement of the device portion 581*b* with respect to the first device portion 581*a* about the axis 583.

The device 580 includes one or more actuators, such as actuators 584, that are configured to apply a feedback force to the second device portion 581*b* along the axis 583 in response to a repositioning force applied to the second device portion 581*b* by a user. The actuators 584 may be integrated in or coupled to the hinge 582. The repositioning force may be detected using sensors 585. As one example, the sensors 585 may include an inertial measurement unit coupled to the second device portion 581*b* and configured to detect an acceleration of the second device portion 581*b*. As another example, the sensors 585 may include an optical position encoder or a magnetic position encoder that is coupled to the hinge 582 or otherwise configured to measure rotation of the second device portion 581*b* relative to the first device portion 581*a* at the axis 583.

The device 580 also includes a controller 586 configured to apply the feedback force using the actuators 584 based on information provided by the sensors 585. The controller 586 may be a computing device or circuit configured to implement the force feedback control process 470. As an example, the controller 586 may be configured to determine a target position and to vary the feedback force in accordance with a position of the second device portion 581*b* with respect to the target position wherein the feedback force is different in a first direction away from the target position than in a second direction toward the target position.

It should be understood that the force feedback control process 470 may be applied to other types of devices as well, such as an adjustable display stand, or any other device where variable feedback may assist a user who is applying a repositioning force to an adjustable portion of the device.

What is claimed is:

1. A device, comprising:
   a member that connects a first part of the device to a second part of the device to allow movement of the second part with respect to the first part about a first axis;
   one or more actuators that are configured to apply a feedback force to the second part along the first axis in response to a repositioning force applied to the second part by a user;
   a camera configured to obtain images of an environment around the device, wherein the camera is coupled to the second part such that movement of the second part with respect to the first part moves the camera with respect to the first part; and
   a controller configured to detect an entity using the images from the camera, determine a target position for the second part according to a position of the entity, and to vary the feedback force in accordance with a position of the second part with respect to the target position wherein a magnitude of the feedback force is different in a first direction away from the target position than in a second direction toward the target position.

2. The device of claim 1, wherein the member is further configured to allow movement of the second part with respect to the first part about a second axis, wherein the feedback force is a first feedback force, and the one or more actuators are further configured to apply a second feedback force along the second axis.

3. The device of claim 2, wherein the second axis is orthogonal to the first axis.

4. The device of claim 2, wherein a magnitude of the first feedback force is different than a magnitude of the second feedback force.

5. The device of claim 1, wherein the entity is the user of the device.

6. The device of claim 1, wherein the target position is selected from a group of positions of interest defined by the controller that each represent an entity that is detected by the camera within a current field of view of the camera and each correspond to a respective position of the second part with respect to the first part.

7. The device of claim 1, wherein the controller operates the one or more actuators to rotate the second part with respect to the first part while obtaining the images using the camera, and the target position is selected from a group of positions of interest defined by the controller that each represent an entity that is detected by the camera during rotation of the second part with respect to the first part.

8. A method, comprising:

obtaining images of an environment using a camera coupled to a second part such that movement of the second part with respect to a first part moves the camera with respect to the first part;

detecting an entity using the images from the camera;

determining a target position for the second part with respect to the first part according to a position of the entity;

comparing a current position of the second part to the target position;

sensing an external force that is applied to the second part;

determining whether a direction of the external force corresponds to movement of the second part away from the target position or movement of the second part toward the target position; and applying a feedback force to the second part using one or more actuators, wherein the feedback force is applied according to a first magnitude in response to determining that the direction of the external force corresponds to movement of the second part away from the target position, and the feedback force is applied according to a second magnitude in response to determining that the direction of the external force corresponds to movement of the second part toward the target position.

9. The method of claim 8, wherein the first magnitude of the feedback force is higher than the second magnitude of the feedback force.

10. The method of claim 8, wherein the first magnitude of the feedback force is lower than the second magnitude of the feedback force.

11. The method of claim 8, wherein the feedback force is a first feedback force that is applied along a first axis, and the one or more actuators are further configured to apply a second feedback force along a second axis.

12. A non-transitory computer-readable storage device comprising program instructions, wherein the program instructions, when executed by a processor, cause the processor to perform operations, the operations comprising:

obtaining images of an environment using a camera coupled to a second part such that movement of the second part with respect to a first part moves the camera with respect to the first part;

detecting an entity using the images from the camera;

determining a target position for the second part with respect to the first part according to a position of the entity;

comparing a current position of the second part to the target position;

sensing an external force that is applied to the second part;

determining whether a direction of the external force corresponds to movement of the second part away from the target position or movement of the second part toward the target position; and applying a feedback force to the second part using one or more actuators, wherein the feedback force is applied according to a first magnitude in response to determining that the direction of the external force corresponds to movement of the second part away from the target position, and the feedback force is applied according to a second magnitude in response to determining that the direction of the external force corresponds to movement of the second part toward the target position.

13. The non-transitory computer-readable storage device of claim 12, wherein the first magnitude of the feedback force is higher than the second magnitude of the feedback force.

14. The non-transitory computer-readable storage device of claim 12, wherein the first magnitude of the feedback force is lower than the second magnitude of the feedback force.

15. The non-transitory computer-readable storage device of claim 12, wherein the feedback force is a first feedback force that is applied along a first axis, and the one or more actuators are further configured to apply a second feedback force along a second axis.

16. The device of claim 1, further comprising:

a display screen coupled to the second part, wherein the images obtained by the camera are displayed on the display screen substantially contemporaneously with capture of the images, and wherein the controller determines the target position such that, when the second part is moved to the target position, the entity detected using the images is positioned at a location on the display screen.

17. The method of claim 8, wherein the target position is selected from a group of positions of interest that each represent an entity that is detected using the images from the camera within a current field of view of the camera, and that each correspond to a respective position of the second part with respect to the first part.

18. The method of claim 8, further comprising operating the one or more actuators to rotate the second part with respect to the first part while obtaining the images using the camera, wherein the target position is selected from a group of positions of interest that each represent an entity that is detected using the images from the camera during rotation of the second part with respect to the first part.

19. The non-transitory computer-readable storage device of claim 12, wherein the operations further comprise selecting the target position from a group of positions of interest that each represent an entity that is detected using the images from the camera within a current field of view of the camera, and that each correspond to a respective position of the second part with respect to the first part.

20. The non-transitory computer-readable storage device of claim 12, wherein the operations further comprise operating the one or more actuators to rotate the second part with respect to the first part while obtaining the images using the camera, and selecting the target position from a group of positions of interest that each represent an entity that is detected using the images from the camera during rotation of the second part with respect to the first part.

* * * * *